Aug. 29, 1950  N. E. COLEGROVE  2,520,492
SPEED REGULATOR FOR ELECTRIC MOTORS
Filed July 20, 1945  2 Sheets-Sheet 1

INVENTOR.
NATHANIEL E. COLEGROVE
BY
Kwis Hudson Boughton & Williams
ATTORNEYS

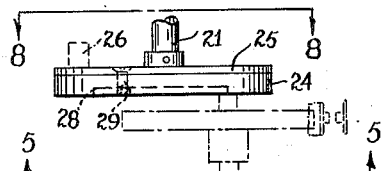
Fig. 4
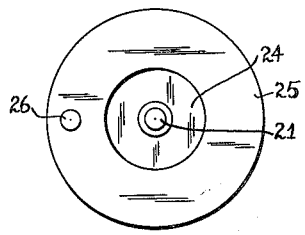
Fig. 8
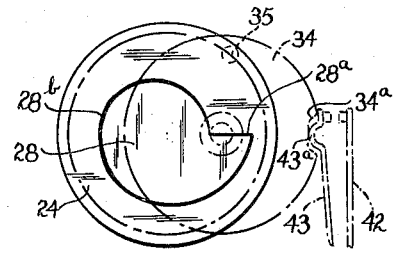
Fig. 5
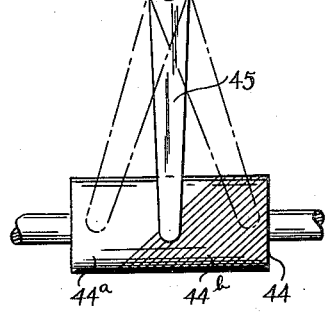
Fig. 9
Fig. 6
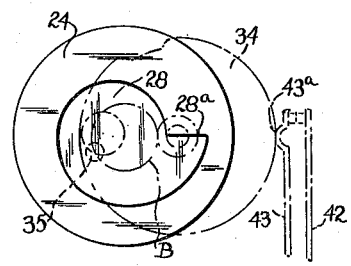
Fig. 7
INVENTOR.
NATHANIEL E. COLEGROVE Patented Aug. 29, 1950

2,520,492

UNITED STATES PATENT OFFICE 2,520,492

SPEED REGULATOR FOR ELECTRIC MOTORS

Nathaniel E. Colegrove, Cleveland, Ohio, assignor to White Sewing Machine Corporation, Cleveland, Ohio, a corporation of Delaware Application July 20, 1945, Serial No. 606,068

3 Claims. (Cl. 318—346)

This invention relates to a speed regulator for an electric drive motor. The drive motor, the speed of which is controlled by the speed regulator embodying the invention, can be utilized for driving various forms of apparatus or devices which it is desired to operate at different predetermined speeds.

As an example of an apparatus which may be driven by such drive motor reference is made to a sewing machine, although it will be understood that this use is merely illustrative and is not referred to in any way as a limitation.

Electric drive motors heretofore have had their speeds controlled by regulators of the centrifugal governor type. These regulators are dependent in their function upon the acceleration or deceleration of the drive motor and are subject to inertia and other effects which minimize their accuracy and efficiency.

An object of the invention is to provide a speed regulator for an electric drive motor which controls the speed of said motor accurately and efficiently, is not dependent in any way upon the acceleration or deceleration of the drive motor and is highly accurate, inasmuch as it is not subject in its function to inertia or other effects.

Electric drive motors also have had their speeds controlled or regulated by control elements which vary the voltage input to the motors. This type of speed regulator or controller has the disadvantage that the motor when operating at low speed is energized at a relatively low voltage and hence the motor at such low speeds does not develop its maximum power. In the operation of certain apparatus or devices at low speed it is desirable and requisite for the drive motor to develop its maximum power if the apparatus or devices are to function at full efficiency. In fact many devices or apparatus require greater power to operate effectively at low speeds than they do when operating at high speeds, at which time the momentum of the parts facilitates the operation of the apparatus or devices. An excellent illustration of the advantage of an electric motor developing full power at low speed is found in connection with the electric drive motor for a sewing machine. The operator of a sewing machine often desires to run the machine at low speed and frequently this situation exists when sewing is being performed on relatively thick materials or upon a number of layers of materials requiring maximum power in passing the needle of the machine through the materials. If the electric drive motor of the sewing machine is controlled by a speed regulator of the type which varies the voltage input to the motor the latter will not develop its full power at low speeds and hence the machine will not function efficiently at low speeds, especially since often the low speed operation of the machine occurs when maximum power is required.

Another object of the invention is to provide a speed regulator for an electric drive motor of such character that the energization of the drive motor is effected always at full line voltage, wherefore the motor will have maximum power within its capacity for low speeds.

Another object of the invention is to provide a speed regulator for an electric drive motor which is entirely independent of the drive motor, that is, is not operated by the drive motor, does not vary the voltage input to the motor, and the motor windings form no part of the speed controlling function.

Further and additional objects and advantages will become apparent hereinafter during the detailed description of an embodiment of the invention which is to follow.

The invention contemplates a speed regulator for an electric drive motor which is entirely separate and distinct from the drive motor. The speed regulator is of such character that it controls the speed of the drive motor by subjecting the latter to energization always at full line voltage for predetermined spaced intervals; that is, it causes a series of impulses at full line voltage to be delivered to the drive motor with the number of these impulses per unit of time and the duration thereof being variable at the will of the operator.

The invention more specifically contemplates including in the speed regulator a constant speed electric regulator motor energized by a circuit separate from the drive motor circuit. The regulator motor actuates a movable member, preferably a rotatable member, and which electrically interconnects separated contact elements in the drive motor circuit for a predetermined interval during each complete cycle of movement of said member. A means provides for a relationship between one of said elements and said member wherein the drive motor is not energized and is idle. During this relationship the regulator motor is automatically deenergized. When this relationship is changed the regulator motor is automatically energized. Also when this relationship is changed an infinite series of relationships between said one element and said member can be obtained for energizing the drive motor for predetermined but variable intervals during each complete cycle of movement of said member by said regulator motor, wherefore a variable series of current impulses at full line voltage can be imparted to the drive motor to cause the same to operate at an infinite number of speeds up to its maximum high speed.

Referring to the accompanying drawings illustrating embodiments of the invention:

Fig. 4 is a detached plan view of the movable member of the regulator which controls the electrical interconnection of the separated contact elements in the drive motor circuit, with the means for adjusting the relationship between said member and one of said elements and for controlling the closing and opening of the circuit breaker in the regulator motor circuit indicated by dot and dash lines.

Figure 3:
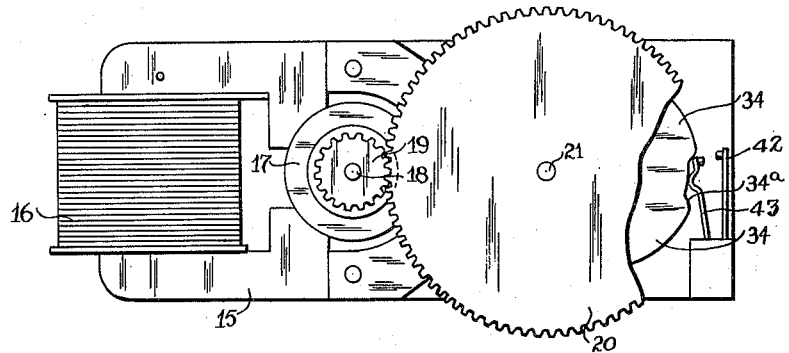
Fig. 3 is a rear elevational view of the speed regulator with a portion of one of the gears broken away.

Fig. 5 is an elevational view taken from line 5—5 of Fig. 4 looking in the direction of the arrows, with the movable member of the regulator shown in full lines and with the adjustable means referred to in connection with Fig. 4 shown by dot and dash lines, it being understood that such adjustable means is located in front of the movable member, the relationship of the parts as indicated in Fig. 5 being such that the regulator motor circuit and the drive motor circuit are both open and both motors are idle.

Fig. 6 is a view similar to Fig. 5 except that the adjustable means has been moved and the regulator motor circuit is closed, while the drive motor circuit will be closed for a short interval of time for each revolution of the movable member.

Fig. 7 is a view similar to Fig. 6 except that the adjustable means has been adjusted so that the drive motor circuit will be closed a greater period of time during each revolution of the movable member, i. e., will be closed continuously and the drive motor will be operating at maximum high speed.

Fig. 8 is an elevational view of the movable member shown in Fig. 4 and is taken looking from line 8—8 of Fig. 4 in the direction of the arrows, and Fig. 9 is a diagrammatic illustration of a different form of movable member for electrically interconnecting the spaced or separated contacts of the drive motor circuit and a different form of adjustable means for varying the time period at which the contact elements will be electrically interconnected for each revolution of the movable member.

The speed regulator may be secured to an attaching plate, not shown, and which plate in turn can be secured to the apparatus or device driven by the electric drive motor. The regulator includes a suitable constant speed regulator motor which may be of various types but which is shown by way of example as a shaded pole constant speed alternating current motor. The stator of the regulator motor is indicated at 15 and includes the stator winding 16. The stator supports bearings 17 for the rotor shaft 18 of the motor and which shaft has fixed thereto the rotor which revolves within the stator 15, as will be well understood by those skilled in the art.

The rotor shaft 18 extends beyond the rear (as viewed in the drawings) bearing 17 and has fixed to its extended end a pinion 19 which continuously meshes with a large gear 20. The gear 20 is fixed to one end of a shaft 21 that is rotatably mounted in a bearing boss 22 carried by a bracket plate 23 that is secured to the stator 15 of the regulator motor. The shaft 21 has its opposite end extending beyond the plate 23 and on this extended end of the shaft 21 the movable member 24 is fixed to rotate with the shaft.

The movable member 24 is illustrated in the form of a disk which is made of suitable insulating material as, for example, a suitable fiber or plastic. The member 24 on its side adjacent to the plate 23 has secured to it a ring or disk 25 of electrically conductive material and which is constantly in contact with a contact element 26 carried by the plate 23 and shown by way of illustration as a carbon brush constructed after the manner of the usual commutator brush used in electric motors. The brush 26 is electrically connected with a binding post 27, also carried by the plate 23.

The movable member 24 on its opposite side has secured thereto a contact plate 28 formed of electrically conductive material and of less area than the side of the movable member 24 and of irregular shape. The contact plate 28 is shown as having a straight edge 28a and a curved peripheral edge 28b, the curvature of which approximates an involute curve. The contact plate 28 is countersunk in the side surface of the member 24 so that the outer surface of the contact plate 28 is flush with the side of the member 24. The ring 25 and the contact plate 28 are electrically connected by suitable means as, for example, by the connecting screw or rivet 29 which extends through the member 24.

A supporting plate 30 is secured to the stator 15 of the regulator motor and said plate 30 carries a bushing 31 which rockably mounts a shaft 32 which has secured to its end outwardly of the supporting plate 30 a crank arm 33 by means of which the shaft 32 is rocked. The shaft 32 inwardly of the plate 30 has fixed to it a regulating disk 34 formed of suitable electrically insulating material, such as fiber or plastic, and provided with a contact point or element 35 similar to the contact point or element 26 and adapted to contact either the adjacent side surface of the member 24 or the contact plate 28, depending upon its adjusted position relative to the member 24.

Figure 1:
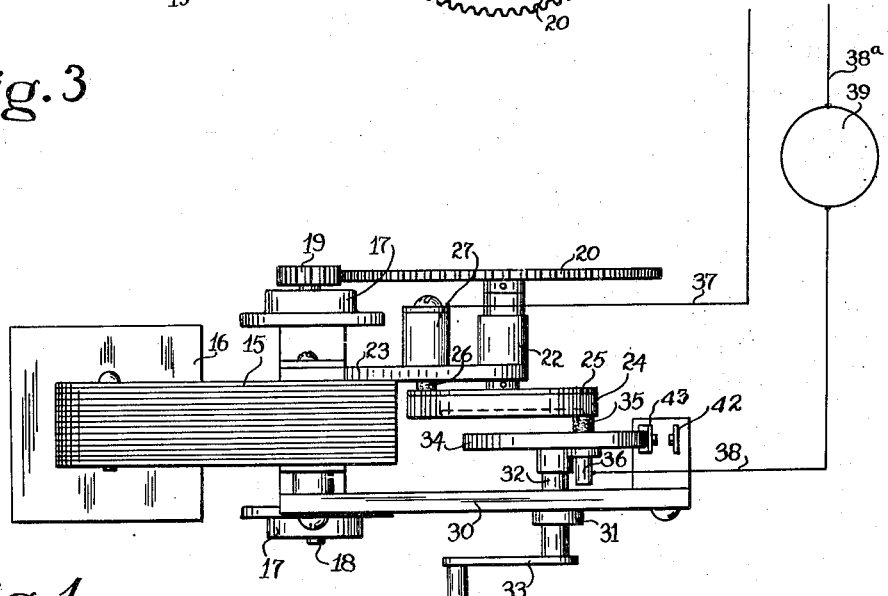
Fig. 1 is a plan view of the speed regulator, with the drive motor and the drive motor circuit connected to the regulator indicated diagrammatically.

The contact element or point 35 is electrically connected with a binding post 36 shown as carried by the regulating disk 34. The binding post 27 is electrically connected with the wire 37 of the drive motor circuit, while the binding post 36 is electrically connected with the wire 38 of said circuit, the drive motor being diagrammatically indicated at 39, see Fig. 1. The wires 37 and 38a of the drive motor circuit are connected to a suitable source of electrical energy.

Figure 2:
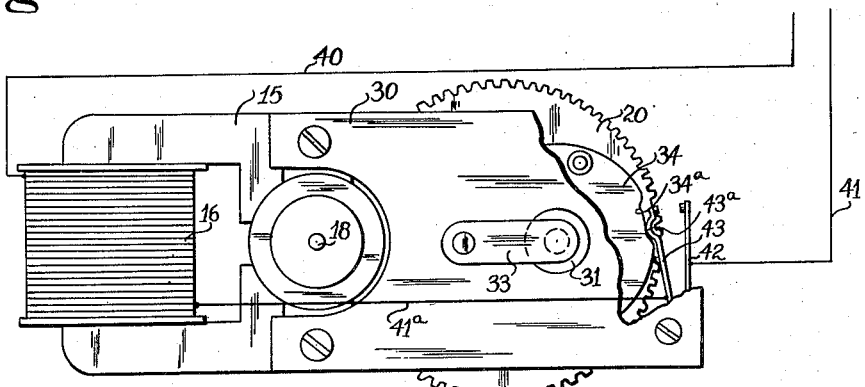
Fig. 2 is a front elevational view of the speed regulator with a portion of the frame of the regulator broken away to disclose the circuit breaker in the regulator motor circuit and which circuit is indicated diagrammatically.

The regulator motor is in a circuit independent of the drive motor circuit, and reference to Fig. 2 shows one wire 40 of the regulator motor circuit as connected directly to the regulator motor while the other wires 41 and 41a of the regulator motor circuit includes a circuit breaker. The wires 40 and 41 of the regulator motor circuit are connected to a suitable source of electric energy, as will be well understood.

The circuit breaker includes a fixed arm 42 carried by the supporting plate 30 and electrically connected with the wire 41 and a movable arm 43 also carried by the plate 30 but electrically connected with the wire 41a. The arms 42 and 43 of the circuit breaker are both provided with contact points which engage when the arms are moved toward each other to close the circuit breaker, but which separate when the arms separate or move away from each other to open the circuit breaker. The movable arm 43 is provided with a bowed portion 43a which engages the periphery of the regulator disk 34. The periphery of the regulator disk 34 is provided with a recess 34a in which the portion 43a of the arm 43 engages when the circuit breaker is open and the circuit to the regulator motor is interrupted. When the portion 43a of the arm 43 is engaging any other part of the periphery of the regulator disk 34 the circuit breaker is closed and the regulator motor is energized. The recess 34a of the regulator disk 34 is disposed a predetermined angular distance from the contact element 35 for a purpose later to be explained.

The operation of the speed regulator will now be described with reference particularly to Figs. 5, 6 and 7. Assuming that the relationship between the movable member 24 of the regulator and the regulator disk 34 is as indicated in Fig. 5, it will be seen that the bowed portion 43a of the movable arm 43 of the circuit breaker is in the notch 34a of the disk and the contacts of the arms 42 and 43 of the circuit breaker are separated and hence the regulator motor circuit is interrupted and the regulator motor is idle. It will also be seen that the contact element 35 carried by the regulator disk 34 is engaging the adjacent side of the member 24 at a location where it does not contact the plate 28 and hence the drive motor circuit is interrupted and said drive motor is idle.

Assuming that the operator wishes to energize the drive motor for slow speed operation to actuate at slow speed the particular device or apparatus with which the motor is used, the operator causes the crank-arm 33 to be moved in a counterclockwise direction, as viewed in the drawing, to rock the shaft 32 and the regulator disk 34 from the position shown in Fig. 5 toward the position shown in Fig. 6. The first part of this movement of the regulator disk 34 causes the bowed portion 43a of the arm 43 of the circuit breaker to ride out of the notch 34a and onto the periphery of the disk 34, thus closing the contacts carried by the arms 43 and 42 and closing the circuit to the regulator motor to energize the same and cause rotation of the member 24. The continued counterclockwise movement of the regulator disk 34 also changes the relationship between the contact element 35 and the member 24 from that shown in Fig. 5 to that shown in Fig. 6. Inasmuch as the member 24 is now rotating the contact element 35 will engage the adjacent face of the member 24 along a circular path A, indicated in Fig. 6. It will be seen that this circular path crosses a small portion of the plate 28 during each revolution of the member 24 and therefore the contact 35 will be in engagement with the plate 28 for a short interval during each revolution of the member 24. The result is that the circuit to the drive motor will be momentarily closed for each revolution of the member 24 and the drive motor 39 will receive an energizing impulse at full line voltage and will operate at low speed but will develop approximately its full power.

Since the contact element 35 after it has been adjusted is stationary and the member 24 is rotating in the direction of the arrow in Fig. 6, it will be seen that the contact element 35 leaves the plate 28 along the straight line portion 28a thereof during each revolution and hence the contact element 35 makes a quick and abrupt disengagement from the plate 28.

If the operator desires to increase the speed of the drive motor 39 the crank-arm 33 is rocked further in a counterclockwise direction to change the relationship between the contact element 35 and the member 24 so that the circular path of relative movement between the contact element 35 and the member 24 includes a greater portion of the plate 28 and hence increases the length of the interval or period during each revolution of the member 24 in which the motor 39 is energized at full line voltage. In this way the speed of the drive motor 39 can be increased to maximum, at which time the contact element 35 is so related to the member 24 that the circular path of relative movement between the contact element 35 and the member 24 is included altogether within the confines of the plate 28 as indicated by the circle B in Fig. 7, and consequently the drive motor 39 is continuously energized at full line voltage and hence is operating at the highest speed within its capacity.

Of course if the operator wishes to decrease the speed of the drive motor 39 from a higher speed the crank-arm 33 is rocked in a clockwise direction to conversely change the relationship between the contact element 35 and the member 24 and to cause shorter intervals of energization of the drive motor 39 for each revolution of the member 24.

It will be noted that the speed of the drive motor 39 can be varied to an infinite number of different speeds between zero and maximum and also that when the adjustment of this relationship is such as to stop the energization of the drive motor 39, i. e., the position shown in Fig. 5, then the circuit breaker arms 42 and 43 are separated and the regulator motor is also deenergized; in other words, the regulator disk performs two functions—first, it effects the energization and deenergization of the regulator motor and second—it controls the speed of the drive motor and the parts are so related that the regulator motor is energized prior to the energization of the drive motor and that the drive motor is deenergized prior to the deenergization of the regulator motor. This arrangement provides for a simple control wherein the operator need only rock the crank arm 33 to control the energization and deenergization of the regulator motor and the drive motor and also to control the speed or operation of the latter motor.

It will further be noted that when the drive motor is operating it is always receiving current impulses at full line voltage, and hence is producing maximum power.

In Fig. 9 there is illustrated a slightly modified form of speed regulator wherein the movable member 24 is replaced by a rotating cylinder 44 which has its circumference subdivided into an insulated portion 44a and an electrically conductive portion 44b, with said latter portion arranged in a spiral about the circumference of the cylinder. A contact element (not shown) corresponding to the contact element 26 will be in continuous engagement with the electrically conductive portion 44b of the cylinder 44. A movable or adjustable contact element 45 will take the place of the contact element 35 and said element 45 can be moved into various positions relative to the cylinder 44 so as to always be in contact with the insulated portion 44a or so as to contact the conductive portion 44b for different periods or intervals for each revolution of the cylinder 44 to complete the circuit to the drive motor 39 and cause current impulses of full line voltage to be imparted to said motor.

Thus the drive motor can be operated at different desired speeds.

In Fig. 9 the contact element 45 is disclosed as a pivoted arm which can be swung to various positions to obtain the relationship between said element and the periphery of the cylinder 44 as just described. The swinging of the contact element or arm 45 from the position wherein it is in contact with the insulated portion 44a only of the cylinder into a position to engage the conductive portion 44b of the cylinder during the latter's rotation can first effect the closing of the circuit to the regulator motor as in the previously described form. In place of such an arrangement a separate manually operated switch might be employed for effecting the energization and deenergization of the regulator motor.

Although several embodiments of the invention have been illustrated and described it will be understood that the invention is susceptible of various modifications and adaptations within the scope of the appended claims.

Having thus described my invention, I claim:

1. A speed regulator for an electric drive motor comprising a constant speed electric regulator motor, an energizing circuit for said regulator motor including a normally open switch, a substantially disk shaped electrically non-conductive rotatable member driven by said regulator motor, an electrically conductive element carried by said member on one side thereof, a contact element continuously in engagement with said electrically conductive element, an irregular shaped electrically conductive element carried by said member on the opposite side thereof, means carried by said member electrically interconnecting said conductive elements, a second contact element engaging the said opposite side of said member, operator actuated means movably mounting said second contact element for sliding over the surface of said opposite side of said member to vary the position of said second contact from one wherein it is out of engagement with said irregular shaped conductive element to one wherein it engages said latter element for a period of predetermined duration during each revolution of said member, the duration of said period being determined by the amount of movement of said operator actuated means, means on said movably mounted means actuating said switch to closed position when said movably mounted means is positioned to effect engagement of said second contact with said irregular shaped conductive element, and a drive circuit for said drive motor and including said contact elements, whereby the said drive motor is operated at speeds less than full speed by impulses of electrical current at full line voltage so that the speed of the said drive motor is determined by the length of time the said contact elements are electrically interconnected during each revolution of said rotatable member.

2. A speed regulator for an electric drive motor comprising a constant speed electric regulator motor, and energizing circuit for said regulator motor and including a circuit breaker having relatively movable contact arms normally spaced from each other, a rockable regulator disk engaging one of said contact arms and having a portion acting to move said arms toward each other to close the circuit breaker and energize said regulator motor and a portion allowing said arms to separate to open the circuit breaker and deenergize said regulator motor, a rotatable member driven by said regulator motor and provided on one side with a regular shaped electrically conductive element and on its opposite face with an irregular shaped electrically conductive element, means carried by said member electrically interconnecting said elements, an independent drive motor circuit including separated contact elements, one of said contact elements continuously engaging said first named electrically conductive element, the other of said contact elements being carried by said regulator disk and so positioned thereon that when said disk has been rocked to close said circuit breaker said contact element is positioned to engage said irregular shaped conductive element of said member once during each revolution thereof for a predetermined period the duration of which depends upon the rocked position of said regulator disk, whereby said drive motor circuit will be closed to energize said drive motor at full line voltage for an interval of predetermined duration in each revolution of said member.

3. A speed regulator for an electric drive motor comprising a constant speed electric regulator motor, an energizing circuit for said regulator motor including a normally open circuit breaker, a disk-shaped rotatable member driven by said regulator motor and having electrically conductive and non-conductive portions, the area of said conductive portion on at least one face of said member being less than the area of that face of the member, regulating means movable in a path parallel with said one face of said member, a contact element mounted on said regulating means and engageable with the conductive portion of said member for a period of selected duration once during each revolution of said member or engageable only with the non-conductive portion thereof depending upon the position of said regulating means, an independent circuit including said contact element and an element in continuous electric conductive relationship with the conductive portion of said member for energizing said drive motor, and means on said regulating means cooperating with said circuit breaker to automatically close the latter when the contact element carried by said regulator means is positioned to engage the conductive portion of said member during each revolution of the latter, or to automatically cause said circuit breaker to open when the contact element is in a position to engage only the non-conductive portion of said member.

NATHANIEL E. COLEGROVE.

REFERENCES CITED

The following references are of record in the file of this patent:

UNITED STATES PATENTS

| Number | Name | Date |
|---|---|---|
| 129,085 | Barjon | July 16, 1872 |
| 720,729 | McDonnell | Feb. 17, 1903 |
| 908,117 | Murray | Dec. 29, 1908 |
| 1,362,844 | Cardoza | Dec. 21, 1920 |
| 1,447,745 | Atkinson | Mar. 6, 1923 |
| 2,109,776 | Johnson | Mar. 1, 1938 |
| 2,390,547 | McCoy | Dec. 11, 1945 |

FOREIGN PATENTS

| Number | Country | Date |
|---|---|---|
| 29,528 | Netherlands | Apr. 15, 1933 |